US012656246B2

(12) United States Patent (10) Patent No.: US 12,656,246 B2
Xie et al. (45) Date of Patent: Jun. 16, 2026

(54) METHODS OF IMAGING PATH POLARIZATION CONTROL FOR DEFECT DETECTION SENSITIVITY ENHANCEMENT

(71) Applicant: KLA Corporation, Milpitas, CA (US)

(72) Inventors: Yun Xie, Shanghai (CN); Rui-Fang Shi, Cupertino, CA (US); Xin Ye, Shanghai (CN); Heng Zhang, Shanghai (CN)

(73) Assignee: KLA Corporation, Milpitas, CA (US)

( * ) Notice: Subject to any disclaimer, the term of this patent is extended or adjusted under 35 U.S.C. 154(b) by 177 days.

(21) Appl. No.: 18/419,244

(22) Filed: Jan. 22, 2024

(65) Prior Publication Data

US 2024/0353318 A1 Oct. 24, 2024

Related U.S. Application Data

(60) Provisional application No. 63/460,902, filed on Apr. 21, 2023.

(51) Int. Cl.
G01N 21/21 (2006.01)
G01N 21/956 (2006.01)
(52) U.S. Cl.
CPC .......... G01N 21/21 (2013.01); G01N 21/956 (2013.01); *G01N 2021/95676* (2013.01); *G01N 2201/061* (2013.01); *G01N 2201/0683* (2013.01)
(58) Field of Classification Search
CPC ................. G01N 21/21; G01N 21/956; G01N 2021/95676; G01N 2201/061; G01N 2201/0683
See application file for complete search history.

(56) References Cited

U.S. PATENT DOCUMENTS

| | | |
|---|---|---|
| 7,423,727 B2 | 9/2008 | Totzeck et al. |
| 10,168,273 B1 | 1/2019 | Huang et al. |
| 2008/0170774 A1 | 7/2008 | Xiong et al. |
| 2019/0003960 A1 | 1/2019 | Huang et al. |

FOREIGN PATENT DOCUMENTS

| | | | | |
|---|---|---|---|---|
| CN | 112880987 | 5/2022 | | |
| EP | 0737856 | 10/1996 | | |
| JP | 2004526168 A | * | 8/2004 | ............... G03F 1/84 |
| WO | WO-2020061241 A1 | * | 3/2020 | ......... G01N 23/2255 |

OTHER PUBLICATIONS

International Search Report and Written Opinion for PCT/US2024/024549 mailed Aug. 14, 2024.

* cited by examiner

*Primary Examiner* — Uzma Alam
*Assistant Examiner* — Fani Polyzos Boosalis
(74) *Attorney, Agent, or Firm* — Entropy Matters LLC

(57) ABSTRACT

Methods and systems for inspecting a photomask are provided. One system includes an illumination subsystem configured to direct light to the photomask. The system also includes a pupil filter positioned in a path of only the light from the photomask and configured for controlling a polarization of the light in the path by mixing four elements in a Jones matrix for the photomask in a coherent manner. In addition, the system includes a detector configured for detecting the light from the pupil filter and generating output responsive to the detected light. The system further includes a computer subsystem configured for detecting defects on the photomask based on the output.

21 Claims, 4 Drawing Sheets

METHODS OF IMAGING PATH POLARIZATION CONTROL FOR DEFECT DETECTION SENSITIVITY ENHANCEMENT

BACKGROUND OF THE INVENTION

1. Field of the Invention

This invention generally relates to methods and systems for inspecting a photomask with polarization control of light from the photomask.

2. Description of the Related Art

The following description and examples are not admitted to be prior art by virtue of their inclusion in this section.

Fabricating semiconductor devices such as logic and memory devices typically includes processing a substrate such as a semiconductor wafer using a large number of semiconductor fabrication processes to form various features and multiple levels of the semiconductor devices. For example, lithography is a semiconductor fabrication process that involves transferring a pattern from a photomask to a resist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

With the performance of 193 nm immersion lithography reaching its limit as well as the substantially high cost and yield issues associated with multi-patterning lithography processes, extreme ultraviolet (EUV) lithography has been under extensive development and is used for next generation lithography (NGL) technology to extend Moore's law, driving computer chips to be smaller, faster, and more efficient.

Defectivity control of EUV photomasks, which define the patterns printed on wafers, plays a critical role from a yield management perspective. The geometries on EUV masks require inspection systems with relatively high image fidelity and substantially low detection noise to resolve the defect features that can cause performance degradation of the integrated circuits fabricated from these masks in EUV lithography.

Some EUV mask inspectors try to maximize the defect signals by controlling polarization within the tool. One traditional method for polarization control is to use waveplates along the illumination path. By appropriately choosing the thickness, orientation of slow axis of these waveplate materials, a required phase shift can be introduced between two perpendicular polarization components of incidence light. For instance, a half-wave plate (HWP) can be used to rotate the polarization direction of linearly polarized light, and a quarter-wave plate (QWP) can convert linearly polarized light into circularly or elliptically polarized light depending on the relative angle between light polarization and the QWP slow axis. Other waveplates and polarization selection elements are used as well. However, their primary purpose is to control the polarization state along the illumination path. Currently used systems do not manipulate the polarization state along the imaging path since the conventional thinking is that after the objective lens, the optical beams are in the paraxial approximation regime and thus the polarization does not play any significant role.

One primary disadvantage of the traditional polarization control methods is that the performance of the conventional polarization states (x, y, or circular polarizations) for defect detection strongly depends on the pattern regions on which the defects reside. Another major disadvantage of the currently used methods is the lack of $J_{xx}+iJ_{yy}$ or $J_{xx}-iJ_{yy}$ Jones matrix terms in the imaging path as evidenced by the description of the embodiments described herein.

Accordingly, it would be advantageous to develop systems and/or methods for inspecting a photomask, and particularly an EUV mask, that do not have one or more of the disadvantages described above.

SUMMARY OF THE INVENTION

The following description of various embodiments is not to be construed in any way as limiting the subject matter of the appended claims.

One embodiment relates to a system configured for inspecting a photomask. The system includes an illumination subsystem configured to direct light to the photomask. The system also includes a pupil filter positioned in a path of only the light from the photomask and configured for controlling a polarization of the light in the path by mixing four elements in a Jones matrix for the photomask in a coherent manner. In addition, the system includes a detector configured for detecting the light from the pupil filter and generating output responsive to the detected light. The system further includes a computer subsystem configured for detecting defects on the photomask based on the output. The system may be further configured as described herein.

Another embodiment relates to a method for inspecting a photomask. The method includes directing light to the photomask and controlling a polarization of light in a path of light from the photomask with a pupil filter positioned in the path of only the light from the photomask and configured for mixing four elements in a Jones matrix for the photomask in a coherent manner. In addition, the method includes detecting light from the pupil filter and generating output responsive to the detected light. The method further includes detecting defects on the photomask based on the output. The detecting step is performed with a computer subsystem.

The steps of the method may be performed as described further herein. In addition, the method may include any other step(s) of any other method(s) described herein. The method may be performed by any of the systems described herein.

An additional embodiment relates to a non-transitory computer-readable medium storing program instructions executable on a computer system for performing a computer-implemented method for inspecting a photomask. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

BRIEF DESCRIPTION OF THE DRAWINGS

Other objects and advantages of the invention will become apparent upon reading the following detailed description and upon reference to the accompanying drawings in which.

Figure 1:
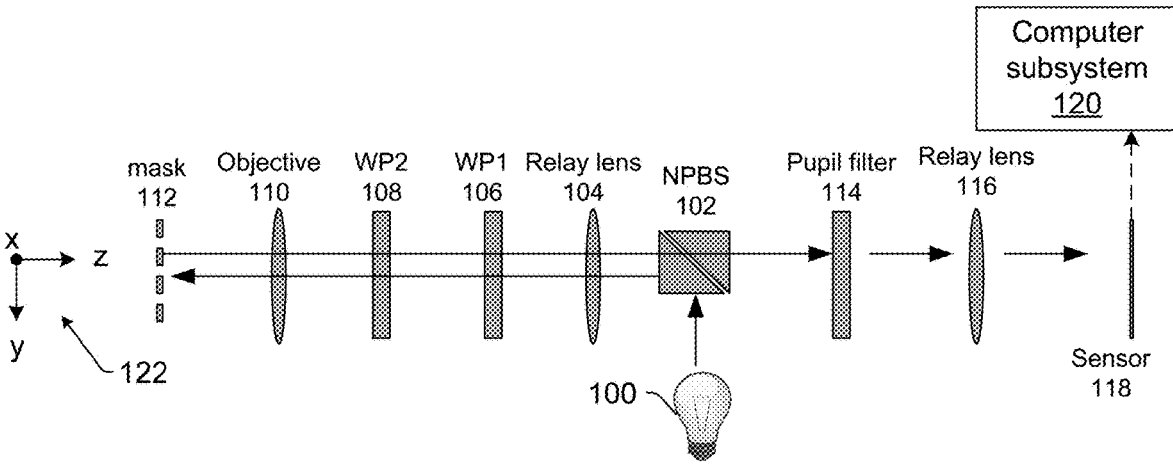
FIG. 1 is a schematic diagram illustrating a side view of an embodiment of a system configured for inspecting a photomask.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

The embodiments described herein generally relate to methods and systems for inspecting a photomask (also referred to herein as a "mask"). More specifically, the embodiments described herein provide methods and systems for image path polarization control for defect detection sensitivity enhancement.

During a photomask inspection using deep ultraviolet (DUV) (e.g., 193 nm wavelength) light, the polarization state of the illumination light has a tremendous impact on the quality of imaging and hence the sensitivity of the mask defect signal. Depending on different mask pattern designs and defect types, the polarization state of illumination light often needs to be adjusted to best distinguish the mask defects. This polarization feature and its control is one of the most important components of a DUV mask inspection tool in improving inspection performance and maintaining tool-to-tool matching.

The importance of a polarization management system becomes even more important when inspecting extreme ultraviolet (EUV) photomasks on which the pattern sizes are typically much smaller than the DUV wavelength used for inspection. The most widely used polarization states for EUV photomask inspection include x, y, and circular polarizations. The performance of using these polarization states for defect detections strongly depends on the orientations and pitches of the pattern regions on which the defects reside.

Less obvious is the impact on defect detection as a result of polarization control/mixing in the imaging path. In the embodiments described herein, new polarization control methods are provided, which may be complementary to the previously used polarization control methods, to improve the defect detection sensitivity, which does not rely on the pattern choices.

In one embodiment, the photomask is configured for use at one or more EUV wavelengths. In this manner, the photomask may be configured for use with EUV light. The EUV light may have a wavelength of about 13.5 nm, one or more wavelengths in a range of about 10 nm to about 124 nm, or one or more wavelengths in a range of about 5 nm to about 30 nm. The photomask may, however, be configured for use with vacuum ultraviolet (VUV) light or soft x-rays. The VUV light may have one or more wavelengths less than 190 nm (meaning that the optical system must be operated in a vacuum to prevent the light from being absorbed by the atmosphere), and soft x-rays have a wavelength of about 0.12 nm to about 5 nm. The photomask may be used with light generated by any suitable light source known in the art capable of emitting light at one or more of these wavelengths. Such light sources include, but are not limited to, laser-induced plasma sources, discharge-induced plasma sources, cathode/anode type sources, etc. The photomask may also be a reticle for use in another lithography process (e.g., 193 nm lithography).

The embodiments described herein are also not limited to inspection of photomasks, but may be used for or configured for inspection of another specimen such as a wafer, which may include any wafer known in the semiconductor arts. In addition, the embodiments described herein may be used for inspection of other specimens such as flat panels, printed circuit boards (PCBs), and other semiconductor specimens.

FIG. 1 shows a representative polarization control feature using the pupil filter. The system includes an illumination subsystem configured to direct light to the photomask. The illumination subsystem shown in FIG. 1 includes light source 100, non-polarizing beam splitter (NPBS) 102, relay lens 104, first wave-plate (WP1) 106, second wave-plate (WP2) 108, and objective 110 that in combination direct light from light source 100 to mask 112. More specifically, in this illustrated optical path, the incident light is first reflected from NPBS 102 through relay lens 104 (a lens for relaying the illumination beam), WP1 106, WP2 108, and objective lens 110. The light directed to the photomask by objective lens 110 is then reflected from the photomask.

In some embodiments, the light includes DUV light. For example, the light may have one or more wavelengths from about 190 nm to about 280 nm. In particular, the light may have a wavelength of about 193 nm. In addition, the light may be monochromatic light, polychromatic light, broadband light, etc. In some such examples, the light source may be a narrowband laser or a broadband plasma (BBP) light source. In addition, the embodiments described herein can be used with any light source emitting light that can be used for one or more of the inspections described further herein.

In one embodiment, the illumination subsystem includes one or more elements configured for controlling a polarization of the light directed to the photomask. For example, as described above, the illumination subsystem may include WP1 106 and WP2 108. These polarization elements may be further configured as described herein.

The system also includes a pupil filter positioned in a path of only the light from the photomask and configured for controlling a polarization of the light in the path by mixing four elements in a Jones matrix for the photomask in a coherent manner. For example, light reflected from photomask 112 travels along the z-axis, passing objective lens 110, WP2 108, WP1 106, relay lens 104, and NPBS 102 again. These elements may therefore be common to the illumination and imaging paths of the system. The light exiting NPBS 102 will be directed through a filter near the pupil position (pupil filter 114) for a further light field modification before reaching the sensor 118 (the terms "sensor" and "detector" are used interchangeably herein). In this manner, as shown in FIG. 1, pupil filter 114 and relay lens 116 may be positioned in the path of the light from the photomask, but not in the path of the light directed to the photomask. In other words, the pupil filter may be positioned only in the imaging path and not in the illumination path.

As described further herein, the configuration of the pupil filter and any other polarization elements in the system (e.g., WP2 108 and WP1 106) may be selected so that four elements in the Jones matrix for the photomask, $J_{PM}$, $$J_{PM} = \begin{pmatrix} J_{xx} & J_{xy} \\ J_{yx} & J_{yy} \end{pmatrix},$$

mix in a coherent manner. Several such configurations are described herein. These configurations and any other possible configurations may be selected as described further herein. Selecting the polarization of the elements of the system so that the four elements in the photomask Jones matrix mix in a coherent manner is an important difference between the embodiments described herein and previously used mask inspection systems and methods. For example, as described further herein, the inventors have discovered that designing the polarizing elements of the system in such a manner that the four elements in the photomask Jones matrix mix coherently will advantageously boost the defect signal while keeping noise essentially the same. In this manner, the embodiments described herein can increase the defect signal-to-noise ratio thereby enabling a higher sensitivity inspection.

The x, y, and z-axes 122 (following the right-handed parity) in this plot are chosen to be the same as the px-, py-, and pz-axes in pupil domain. The widely used x, y, or circular polarized illumination (e.g., the polarization control design in currently used photomask defect inspection tools) can also be generated using this design by appropriately choosing the phase shift and orientation angles of the two wave-plates, WP1 and WP2, without adding the pupil filter. In this sense, the pupil filter design can be a complementary polarization control method to other polarization control schemes.

Referring to the optical path shown in FIG. 1, the polarization state of light can be modelled using Jones calculus by sequentially multiplicate the Jones matrices of the polarization elements as

6

$$E_{Out} = J_{PF} \cdot J_{WP1}(\phi_1, \theta_1) \cdot J_{WP2}(\phi_2, \theta_2) \cdot J_{PM} \cdot J_{WP2}(\phi_2, \theta_2) \cdot J_{WP1}(\phi_1, \theta_1) \cdot E_{In}$$

In the above equation, the Jones matrix for NPBS is ignored because it can be represented by a unit matrix with constant scaling (in this case, $\sqrt{2}/2$). $J_{WP1/2}(\phi, \theta)$ represents the Jones matrix for WP1 and WP2. $\phi$ is the phase shift between the fast and slow axis introduced by the wave-plate, and $\theta$ represents the orientation angle of the slow axis with respect to the x-axis. The expression of Jones matrix for a rotated wave-plate given the two parameters ($\phi$, $\theta$) is:

$$J_{WP}(\phi, \theta) = \begin{pmatrix} \cos\frac{\phi}{2} + i\sin\frac{\phi}{2}\cos2\theta & i\sin\frac{\phi}{2}\sin2\theta \\ i\sin\frac{\phi}{2}\sin2\theta & \cos\frac{\phi}{2} - i\sin\frac{\phi}{2}\cos2\theta \end{pmatrix}$$

The polarization state of light reflected from the photomask is also modified, which can be represented using a photomask Jones matrix $J_{PM}$. For example, in one embodiment, the pupil filter is positioned in a pupil plane of the system, and the illumination subsystem and the pupil filter are configured so that an output field on the pupil plane is a function of the four elements in the Jones matrix for the photomask, $$J_{PM} = \begin{pmatrix} J_{xx} & J_{xy} \\ J_{yx} & J_{yy} \end{pmatrix}.$$

The four elements in $J_{PM}$ fully describe the magnitude transformation of the light field for one point on the pupil plane. The specific values of $J_{PM}$ can be estimated using electromagnetic simulation software (e.g., using the rigorous coupled-wave analysis). $J_{PF}$ represents the Jones matrix for the designed pupil filter. With given wave-plates and pupil filter designs, the output field on the pupil plane can be formulated as a function of the four elements in $J_{PM}$, $$J_{PM} = \begin{pmatrix} J_{xx} & J_{xy} \\ J_{yx} & J_{yy} \end{pmatrix}$$

The system further includes a detector (e.g., sensor 118) configured for detecting the light from the pupil filter and generating output responsive to the detected light. The detector may include any suitable detector known in the art such as a two-dimensional (2D) detector, charge coupled device (CCD camera), time delay integration (TDI) camera, etc. In this manner, the detector may detect light as a function of position within the image plane of the detector. Other types of detectors may be used as well. For example, a photomultiplier tube may be used as the detector.

The detector may also include a non-imaging detector or imaging detector. If the detector is a non-imaging detector, the detector may be configured to detect certain characteristics of the light such as intensity but may not be configured to detect such characteristics as a function of position within the imaging plane. As such, the output that is generated by the detector may be signals or data, but not image signals or image data. However, in other instances, the detector may be configured as an imaging detector that is configured to generate imaging signals or image data. Therefore, the detector may be configured to generate output and/or images in a number of ways.

The system also includes a computer subsystem configured for detecting defects on the photomask based on the output. Computer subsystem 120 may be coupled to detector 118 in any suitable manner (e.g., via one or more transmission media, which may include "wired" and/or "wireless" transmission media) such that the computer subsystem can receive the output, images, etc. generated by detector 118. Computer subsystem 120 may be configured for detecting defects on photomask 112 by applying a defect detection method to the output generated by detector 118. In addition, detecting defects on the mask may be performed in any suitable manner known in the art (e.g., applying a defect detection threshold to the output and determining that any output having a value above the threshold corresponds to a defect (or a potential defect)) with any suitable defect detection method and/or algorithm. This computer subsystem may be further configured as described herein.

The computer subsystem may also be referred to as a computer system. Each of the computer subsystems or systems described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem may also include any suitable processor known in the art such as a parallel processor. In addition, the computer subsystem may include a computer platform with high speed processing and software, either as a standalone or a networked tool.

If the system includes more than one computer subsystem, then the different computer subsystems may be coupled to each other such that images, data, information, instructions, etc. can be sent between the computer subsystems as described further herein. For example, computer subsystem 120 may be coupled to another computer subsystem (not shown) by any suitable transmission media (not shown), which may include any suitable wired and/or wireless transmission media known in the art. Two or more of such computer subsystems may also be effectively coupled by a shared computer-readable storage medium (not shown).

In one embodiment, the system is configured for modifying the pupil filter or one or more polarizing elements in the illumination subsystem to thereby generate different output fields on a pupil plane in which the pupil filter is positioned. For example, the system may include a control subsystem (not shown) configured for modifying one or more polarizing elements in the illumination subsystem and the pupil filter as described further herein, e.g., by moving them into or out of position in the system and/or by rotating one or more of the elements. In one such embodiment, computer subsystem 120 may be configured to perform such control functions and/or may include a control subsystem configured for controlling one or more of the polarizing elements.

The control subsystem may include a computer subsystem and possibly other elements such as firmware, a servo loop, and any other suitable controller type elements known in the art. The firmware and servo loop may have any suitable configuration known in the art suitable for altering a parameter of at least one of the pupil filter and one or more of the polarizing elements included in the illumination subsystem. For example, the control subsystem may be configured for controlling one or more actuators to move the pupil filter and/or a polarizing element in the illumination subsystem. The alterations to the parameter(s) of the polarizing element(s) may be determined in any suitable manner, e.g., based on a recipe for a photomask inspection process.

In one such embodiment, a first of the different output fields is created with $J_{xx}+iJ_{yy}$ in orthogonal components of the first of the different output fields, and a second of the different output fields is created with $J_{xx}-iJ_{yy}$ in orthogonal components of the second of the different output fields. For example, one of the important aspects of the embodiments described herein is utilizing a pupil filter design for polarization control and creating the $J_{xx}+iJ_{yy}$ and $J_{xx}-iJ_{yy}$ combinations in the output field to enhance inspection sensitivity. Several ways of achieving these combinations in the output field are described and shown in FIGS. 2, 6, and 7. The $J_{xx}+iJ_{yy}$ and $J_{xx}-iJ_{yy}$ combinations in the output field enhance inspection as described further herein.

Figure 2:
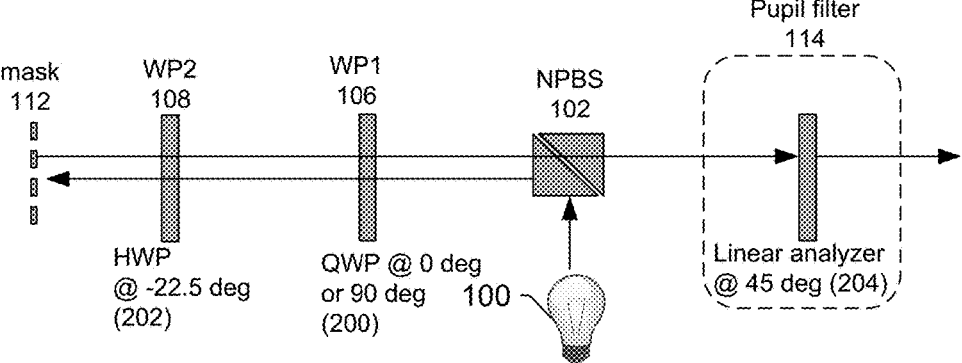
FIG. 2 is a schematic diagram illustrating a side view of an embodiment of a portion of a system configured for inspecting a photomask using a pupil filter for polarization control.

In some embodiments, the pupil filter is configured as a linear analyzer oriented at 45-degree. FIG. 2 shows one embodiment of using such a pupil filter for polarization control. In one such embodiment, the illumination subsystem includes a quarter-wave plate oriented at 90-degree and a half-wave plate oriented at −22.5 degree. For example, as shown in FIG. 2, WP1 106 can be a quarter-wave plate (QWP 200) oriented at 90-degree, WP2 108 can be a half-wave plate (HWP 202) oriented at −22.5 degree, and pupil filter 114 can be a linear analyzer (204) oriented at 45-degree. Let the polarization of incident light be x-pol, the output field on the pupil plane can be described as:

$$E_{Out} = \frac{1}{4}\begin{bmatrix} 1 & 1 \\ 1 & 1 \end{bmatrix}\begin{bmatrix} 1 & 0 \\ 0 & i \end{bmatrix}\begin{bmatrix} 1 & -1 \\ -1 & -1 \end{bmatrix}\begin{bmatrix} J_{xx} & J_{xy} \\ J_{yx} & J_{yy} \end{bmatrix}\begin{bmatrix} 1 & -1 \\ -1 & -1 \end{bmatrix}\begin{bmatrix} 1 & 0 \\ 0 & i \end{bmatrix}\begin{bmatrix} 1 \\ 0 \end{bmatrix} =$$
$$\frac{1}{4}\begin{bmatrix} (1-i)(J_{xx}+iJ_{yy}-J_{xy}-iJ_{yx}) \\ (1-i)(J_{xx}+iJ_{yy}-J_{xy}-iJ_{yx}) \end{bmatrix}$$

In another such embodiment, the system is configured for rotating the QWP from 90-degree to 0-degree without modifying the HWP and the linear analyzer to thereby generate different output fields on a pupil plane in which the linear analyzer is positioned. For example, by rotating the WP1 from 90-degree to 0-degree and keeping other polarizing elements the same, a second pupil filter design is realized, and the corresponding output field is modelled as:

$$E_{Out} = \frac{1}{4}\begin{bmatrix} 1 & 1 \\ 1 & 1 \end{bmatrix}\begin{bmatrix} 1 & 0 \\ 0 & -i \end{bmatrix}\begin{bmatrix} 1 & -1 \\ -1 & -1 \end{bmatrix}\begin{bmatrix} J_{xx} & J_{xy} \\ J_{yx} & J_{yy} \end{bmatrix}\begin{bmatrix} 1 & -1 \\ -1 & -1 \end{bmatrix}\begin{bmatrix} 1 & 0 \\ 0 & -i \end{bmatrix}\begin{bmatrix} 1 \\ 0 \end{bmatrix} =$$
$$\frac{1}{4}\begin{bmatrix} (1+i)(J_{xx}-iJ_{yy}-J_{xy}+iJ_{yx}) \\ (1+i)(J_{xx}-iJ_{yy}-J_{xy}+iJ_{yx}) \end{bmatrix}$$

The embodiment shown in FIG. 2 provides a pupil filter design to control the polarization state of the output field. In some embodiments, a first of the different output fields is created with $J_{xx}+iJ_{yy}$ in orthogonal components of the first of the different output fields, and a second of the different output fields is created with $J_{xx}-iJ_{yy}$ in orthogonal components of the second of the different output fields. For example, the essence of the pupil filter designs shown in FIG. 2 is to create the $J_{xx}+iJ_{yy}$ and $J_{xx}-iJ_{yy}$ combinations in both the orthogonal components of the output field, as can be seen in the above derivations. Let us denote the polarization design that gives $J_{xx}+iJ_{yy}$ output field as J0-polarization and the design that gives $J_{xx}-iJ_{yy}$ output as J1-polarization. These two kinds of polarization states are lacking in the currently used polarization control schemes, which do not include the pupil filters described herein. The embodiment of the polarization pupil filter design shown in FIG. 2 may be included in a system configured as shown in FIG. 1.

Figure 3:
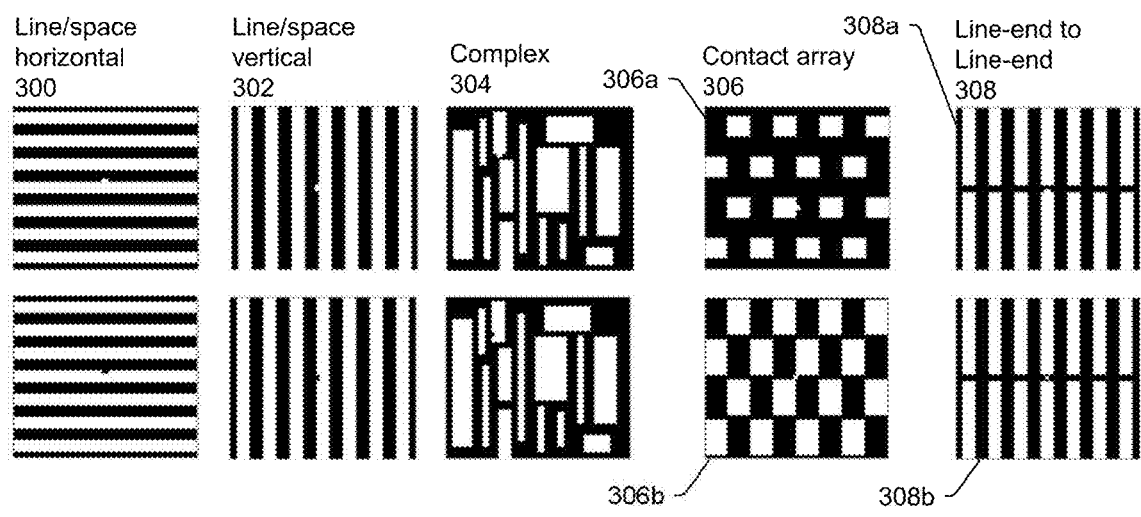
FIG. 3 is a schematic diagram illustrating a top view of examples of pattern defects of multi-layer (ML) protrusion and intrusion in dense line/space and complex pattern regions, ML protrusion and corner-to-corner defects in contact array regions, and ML protrusion and pinhole in line-end to line-end regions.

In another embodiment, first peak through-focus signals in the output for the defects generated with the pupil filter positioned in the path of the light from the photomask are higher than second peak through-focus signals in the output for the defects generated without the pupil filter positioned in the path of the light from the photomask. For example, in a further embodiment, first peak through-focus signals in the output for the defects generated with the first or second of the different output fields are higher than second peak through-focus signals in the output for the defects generated without the pupil filter positioned in the path of the light from the photomask. In particular, by generating the $J_{xx} \pm i J_{yy}$ in the output field, the signal of some typical pattern defects on EUV photomasks can be significantly enhanced. As a simple example shown in FIG. 3, ten representative pattern defects are used to test the performance of the pupil filter designs, including multi-layer (ML) protrusion and intrusion defects in dense line/space (pitch=200 nm, aspect ratio=0.5) and complex pattern regions, corner-to-corner defects in contact array regions (pitch=800 nm in y-direction, pitch=400 nm in x-direction, pattern size=200×200 nm for square contacts and 200×360 nm for rectangular contacts), and ML protrusion/pinhole defects on line-end to line-end regions. More specifically, in FIG. 3, dense line-space horizontal pattern region 300, dense line-space vertical pattern region 302, and complex pattern region 304 are shown with ML protrusion defects in the top row and ML intrusion defects in the bottom row. ML protrusion 306a and corner-to-corner 306b defects are shown in contact array regions 306. In addition, ML protrusion 308a and ML pinhole 308b defects are shown in line-end to line-end region 308. In FIG. 3, the dark region is for absorber, and the white region is for ML.

In some embodiments, first peak through-focus signals in the output for different types of the defects generated with the pupil filter positioned in the path of the light from the photomask are higher than second peak through-focus signals in the output for the different types of the defects generated without the pupil filter positioned in the path of the light from the photomask. For example, without loss of generality, assume the numerical aperture (NA) of the DUV imaging system is 0.9 and consider the condition of illumination for a flat-top circular source. The coherence of illumination is set to be 0.6 NA. The photomask diffractions and aerial image intensity are calculated using the rigorous coupled-wave analysis method implemented in the electromagnetic simulator PROLITH, commercially available from KLA Corp., Milpitas, CA. For defect sensitivity analyses, the maximum pixel-wise intensity in the difference image between defect-free and defective images is calculated as defect signal assuming the pixel size equals 51 nm.

Figure 4:
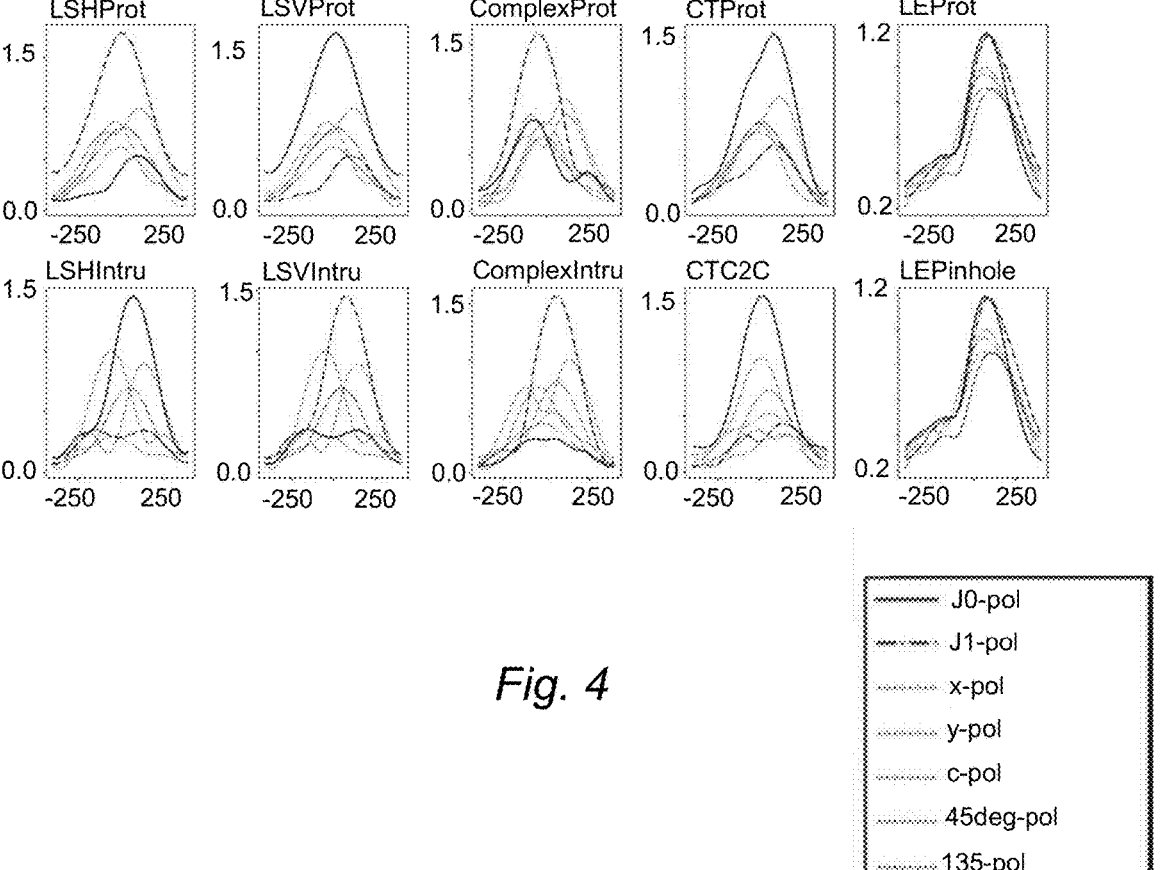
FIG. 4 includes plots illustrating examples of through-focus signals for the defects shown in FIG. 3 using different polarization control schemes.

FIG. 4 shows the performance of using pupil filters for polarization control in enhancing the defect signals of the defects shown in FIG. 3. For all tested defect types, the peak through-focus signals using different polarization schemes J0-polarization or J1-polarization for the pupil filter design embodiments described herein are much larger compared with the reference polarizations (x polarization, y polarization, linear polarization @ 45 degree, linear polarization @ 135 degree, circular polarization). The tested defect types include protrusion defects in horizontal line-space patterns (LSHProt), intrusion defects in horizontal line-space patterns (LSHIntru), protrusion defects in vertical line-space patterns (LSVProt), intrusion defects in vertical line-space patterns (LSVIntru), protrusion defects in complex patterns (ComplexProt), intrusion defects in complex patterns (ComplexIntru), protrusion defects in contact array regions (CTProt), corner-to-corner defects in contact arrays (CTC2C), protrusion defects in line-end to line-end regions (LEProt), and pinhole type defects in line-end to line-end regions (LEPinhole).

Table 1 gives the corresponding signal enhancement ratios for different defects. With the polarization pupil filter, the defect signals can be boosted by about 50% on average. For the ML-protrusion defects in dense line/space regions, the signal is increased by more than 70%. The ubiquitous signal enhancement for all tested defects indicates that the improvement of using pupil filters is not dependent on the pattern choices.

TABLE 1

| | | | | | | |
|---|---|---|---|---|---|---|
| | | | Peak relative signal (x/y/c/ 45/135-pol) | | | Focus @ peak signal (x/y/c/ 45/135-pol) |
| Patterns | Defect types | Peak relative signal (J0/J1-pol) | | Signal boost ratio (J0/J1-pol) | Focus @ peak signal (J0/J1-pol) | |
| Line/space horizontal | ML protrusion | 1.74 | 1 | 74% | 0 nm | 105 nm |
| Line/space horizontal | ML intrusion | 1.45 | 1 | 45% | 80 nm | −53 nm |
| Line/space vertical | ML protrusion | 1.74 | 1 | 74% | 0 nm | 105 nm |
| Line/space vertical | ML intrusion | 1.45 | 1 | 45% | 80 nm | −53 nm |
| Complex patterns | ML protrusion | 1.59 | 1 | 59% | −50 nm | 107 nm |
| Complex patterns | ML intrusion | 1.57 | 1 | 57% | 53 nm | 137 nm |
| Contact array | ML protrusion | 1.54 | 1 | 54% | 80 nm | 100 nm |
| Contact array | Corner to corner | 1.56 | 1 | 56% | 27 nm | 57 nm |
| Line-end to line-end | ML protrusion | 1.2 | 1 | 20% | 81 nm | 110 nm |
| Line-end to line-end | ML pinhole | 1.2 | 1 | 20% | 81 nm | 110 nm |

Figure 5:
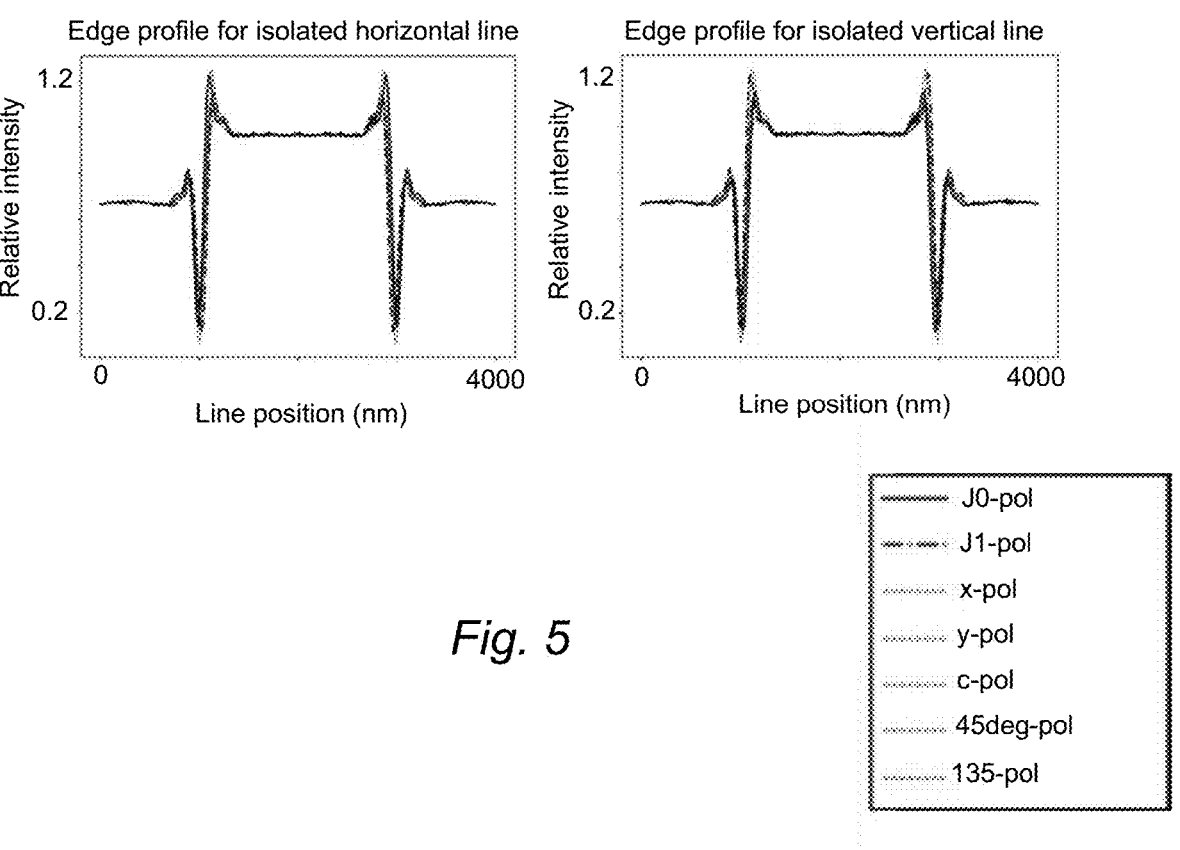
FIG. 5 includes plots illustrating examples of edge profiles of isolated horizontal and vertical patterns under different polarization schemes.

In another embodiment, first noise in the output generated for the photomask with the pupil filter positioned in the path of the light from the photomask is approximately equal to second noise in the output generated for the photomask without the pupil filter positioned in the path of the light from the photomask. Noise that qualifies as "approximately equal" in the embodiments described herein can range from being negligibly different to within the standard deviation in the noise. For example, the edge profiles of isolated horizontal and vertical lines generated with the pupil filter design embodiments described herein barely change compared with the same profiles generated with the reference polarizations, as shown in FIG. 5. The edge-overshoot and edge-undershoot imaged using J0/J1-polarizations are substantially close to the reference polarizations. In this manner, the modelling noise in die-to-database (DDB) inspection mode or the line-edge-roughness (LER) noise in die-to-die (DD) inspection mode will be similar if switching from reference polarizations to the pupil filter design embodiments described herein. In this sense, considering the relatively strong defect signal boost described above, the signal-to-noise ratio (SNR) and hence the defect capture rate can be enhanced using the pupil filter embodiments described herein.

In an additional embodiment, a first best focus variation range of the system with the pupil filter positioned in the path of the light from the photomask is smaller than a second best focus variation range of the system without the pupil filter positioned in the path of the light from the photomask. For example, besides the advantage in defect sensitivity described above, using pupil filters for polarization control also helps to reduce the focus variations. Define the focus value that gives the peak defect signal as best focus, referring to the last two columns in Table 1, the variation of best focus using the pupil filters described herein is within ±65 nm, while the variation for reference polarizations is in the range of ±95 nm. A smaller best focus variation range of using the pupil filter embodiments described herein can help the inspection tool to capture most defects around the peak signal which in turn increases the SNR.

Figure 6:
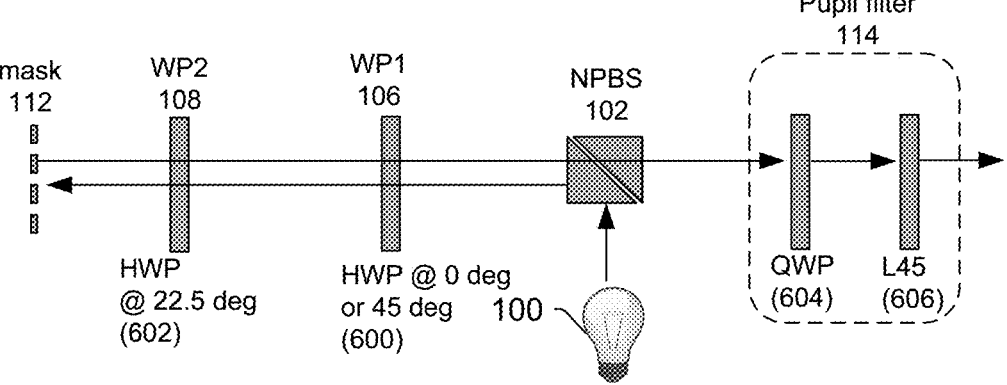
FIGS. 6-7 are schematic diagrams illustrating side views of embodiments of a portion of a system configured for inspecting a photomask using a pupil filter for polarization control.

Although one embodiment of a pupil filter design is shown in FIG. 2, the embodiments described herein can use other pupil filters for imaging path polarization control as long as they are configured to create the $J_{xx} \pm iJ_{yy}$ combinations in the output field. For example, in one embodiment, the pupil filter includes a QWP oriented at 0-degree in combination with a linear analyzer oriented at 45-degree. In one such embodiment, the illumination subsystem includes a first HWP oriented at 0-degree and a second HWP oriented at 22.5 degree. One such embodiment of a pupil filter design is shown in FIG. 6. In this embodiment, the WP1 can be HWP 600 oriented at 0-degree, WP2 can be HWP 602 oriented at 22.5-degree, and pupil filter 114 may include QWP 604 oriented at 0-degree along with linear analyzer (L45 606) oriented at 45-degree. The embodiment of the polarization pupil filter design shown in FIG. 6 may be included in a system configured as shown in FIG. 1.

In another such embodiment, the system is configured for rotating the first HWP from 0-degree to 45-degree without modifying the second HWP and the pupil filter to thereby generate different output fields on a pupil plane in which the pupil filter is positioned. In some embodiments, a first of the different output fields is created with $J_{xx} + iJ_{yy}$ in orthogonal components of the first of the different output fields, and a second of the different output fields is created with $J_{xx} - iJ_{yy}$ in orthogonal components of the second of the different output fields. For example, using the embodiment shown in FIG. 6, the $J_{xx} + iJ_{yy}$ combination can be realized in the output field. By switching the WP1 from 0-degree to 45-degree, a second pupil filter design generating $J_{xx} - iJ_{yy}$ is realized. Therefore, the embodiment shown in FIG. 6 provides a pupil filter design to control the polarization state of the output field.

Figure 7:
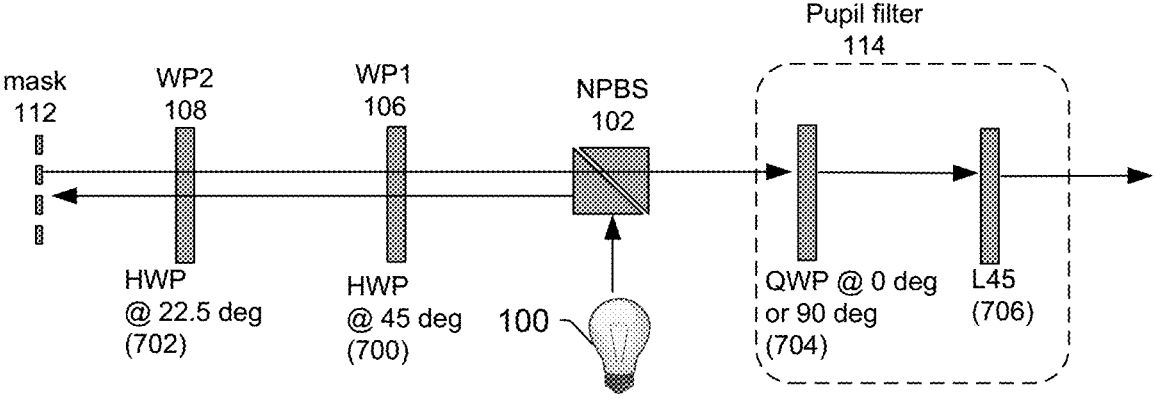

FIG. 7 shows another embodiment of the polarization pupil filter design. In this embodiment, the illumination subsystem includes a first HWP oriented at 45-degree and a second HWP oriented at 22.5 degree. For example, in this design, WP1 can be HWP 700 oriented at 45-degree, WP2 can be HWP 702 oriented at 22.5-degree, and pupil filter 114 can include QWP 704 oriented at 0-degree and linear analyzer (L45) 706 oriented at 45-degree. The embodiment of the polarization pupil filter design shown in FIG. 7 may be included in a system configured as shown in FIG. 1.

In one such embodiment, the system is configured for rotating the QWP of the pupil filter from 0-degree to 90-degree without modifying the linear analyzer of the pupil filter, the first HWP, and the second HWP to thereby generate different output fields on a pupil plane in which the pupil filter is positioned. In an additional embodiment, a first of the different output fields is created with $J_{xx} + iJ_{yy}$ in orthogonal components of the first of the different output fields, and a second of the different output fields is created with $J_{xx} - iJ_{yy}$ in orthogonal components of the second of the different output fields. Using the embodiment shown in FIG. 7, the $J_{xx} + iJ_{yy}$ combination can be realized in the output field. By orienting the QWP of the pupil filter from 0-degree to 90-degree, a second pupil filter design generating $J_{xx} - iJ_{yy}$ in the output field is realized. Therefore, the embodiment shown in FIG. 7 provides a pupil filter design to control the polarization state of the output field.

Although several embodiments are described above with specific parameters for the polarizing elements in the illumination and imaging paths to illustrate the embodiments, the methods described herein are quite general and not restricted to the embodiments described above. In other words, it may be possible to use other polarizing elements for the pupil filter, WP1, and WP2 to achieve the same advantages described herein.

The embodiments described herein are also particularly advantageous for EUV mask inspection with specularly reflected DUV light, i.e., non-actinic EUV mask inspection. The embodiments may however be configured for inspection of other types of specimens including those described herein with other types of light (e.g., transmitted, diffracted, etc. instead of specularly reflected light).

In addition, although the embodiments are described herein with illumination subsystems that include polarizing elements in addition to the polarizing element(s) in the pupil filter, the embodiments do not need to be implemented with polarizing element(s) in the illumination path. For example, the embodiments described herein can use a pupil filter for imaging path polarization control configured as described herein in combination with any other polarizing elements arranged in any other position in the illumination and/or imaging paths as long as the pupil filter and any other polarizing element(s) are configured to create the $J_{xx} \pm iJ_{yy}$ combinations in the output field. Furthermore, the systems described herein may include one or more elements that are common to the illumination and imaging paths as shown in FIG. 1, but the systems may be configured such that the illumination and imaging paths are completely separate, each with their own optical elements.

In some embodiments, the system is configured for positioning the pupil filter in the path of only the light from the photomask for a first mode of the system, positioning the pupil filter out of the path of the light from the photomask for a second mode of the system, and inspecting the photomask with the first and second modes. For example, the architecture shown in FIG. 1 may be used as a polarization control feature on an inspection tool, and the pupil filters can be made a complementary method to conventional polarization control schemes. In other words, one of the pupil filter designs described herein can be used for one mode of a system used for inspection of a mask, and the pupil filter may be moved out of the path of the light so that the system can be used for another mode of inspection of the same mask. Defects detected with output generated in both configurations may be combined into one inspection result for the mask. In addition or alternatively, the output generated for each mode may be used in combination for detecting defects on the mask. In this manner, the pupil designs described herein may be used for one mode of a multi-mode inspection in the same manner as any other mode available on the inspection tool.

Although the multi-mode inspection may be achieved as described above by moving the pupil filter into and out of the imaging path of the system, the multi-mode inspection may be achieved by positioning a beam splitter (not shown) in front of the pupil filter. That beam splitter may be configured to reflect a portion of the light from NPBS 102 shown in FIG. 1 to another detector (not shown) possibly in combination with one or more other elements such as a relay lens (not shown). The beam splitter may also be configured to transmit the remaining portion of the light to pupil filter 114. In this manner, different modes of inspection may be performed simultaneously on the mask. While this configuration will result in less light being available for each mode, when there is sufficient light for both modes, such a configuration provides additional advantages such as better throughput and not requiring movement of the pupil filter into and out of the imaging path.

As described above, different modes may be implemented with different polarizations controlled by the pupil filter (or lack thereof) for one inspection of one mask. In a similar manner, the system may be configured for performing inspection with one or more other different parameters. For example, different modes of inspection may be performed using only one of the polarization configurations described herein and with different values of focus. In another example, different modes of the tool may include different polarization configurations described herein but the same value of focus in both modes. Other parameters of the tool may be altered in a similar manner.

The embodiments described herein may also be configured for illuminating only one contiguous area on the specimen (e.g., only one point, spot, line, two-dimensional area, or field) at a time or for simultaneous illumination of separate, non-contiguous areas on the specimen (e.g., different points, different spots, different lines, different fields, etc.). In such embodiments, the parameters used for inspection with one of the different areas may be the same or preferably different. For example, one illuminated field may be inspected with a first polarization configuration and a first focus value, and another illuminated field may be inspected with the same polarization configuration but a second, different focus value. Alternatively, one illuminated field may be inspected with a first polarization configuration and a first focus value, and another illuminated field may be inspected with a second, different polarization configuration and the same focus value.

In one such embodiment, the systems described herein may include more than one set of the optical elements described herein such as two sets of the elements shown in FIG. 1. Alternatively, two separate areas on the specimen may be illuminated with the same illumination subsystem, and the light from the different areas may be directed to two different detection channels (not shown). For example, as described above, the system shown in FIG. 1 may include an additional beam splitter (not shown) positioned between NPBS 102 and pupil filter 114, and light reflected by the additional beam splitter may be directed to possibly one or more additional elements (not shown) like a different pupil filter followed by a different relay lens and then a different detector. In such an embodiment, the different detectors may be positioned at different focal planes so that the light from the different illuminated areas can be detected at different focus values. In addition or alternatively, the pupil filters in the different detection channels may have the same configuration so that the polarization configurations for the different illuminated areas are the same. The pupil filters in the different detection channels may alternatively have different configurations so that the polarization configurations used for the different illuminated areas are different.

Any of the systems described herein may also include a scanning subsystem (not shown) configured to cause the light to be scanned over the photomask. For example, the system may include a stage (not shown) on which photomask 112 is disposed. The scanning subsystem may include any suitable mechanical and/or robotic assembly (that includes the stage) that can be configured to move the photomask such that the light can be scanned over the photomask. In addition, or alternatively, the system may be configured such that the one or more optical elements perform some scanning of the light over the photomask. The light may be scanned over the photomask in any suitable fashion.

FIGS. 1-2 and 6-7 are provided herein to generally illustrate some configurations of optical elements that may be included in the system embodiments described herein. Obviously, the optical element configurations described herein may be altered to optimize the performance of the system as is normally performed when designing a commercial system. In addition, the systems described herein may be implemented using an existing system (e.g., by adding the pupil filter embodiments described herein to an existing system) such as systems that are commercially available from KLA. For some such systems, the embodiments described herein may be provided as optional functionality of the existing system (e.g., in addition to other functionality of the system). Alternatively, the system described herein may be designed "from scratch" to provide a completely new system.

The embodiments described herein may be configured for inspection of a photomask and/or another process for a photomask such as metrology and/or defect review. For example, the systems described herein may be also or alternatively be configured as metrology systems or defect review systems. For example, the embodiment of the system shown in FIG. 1 may be modified in one or more parameters to provide different imaging capability depending on the application for which it will be used. In one such example, the system may be configured to have a higher resolution if it is to be used for metrology rather than for inspection. In other words, the embodiment of the system shown in FIG. 1 describes some general and various configurations for a system that can be tailored in a number of manners that will be obvious to one skilled in the art to produce systems having different capabilities that are more or less suitable for different applications.

In this manner, the system may be configured for generating output that is suitable for re-detecting defects on the photomask in the case of a defect review system and for measuring one or more characteristics of the photomask in the case of a metrology system. In a defect review system embodiment, computer subsystem 120 may be configured for re-detecting defects on photomask 112 by applying a defect re-detection method to the output generated by detector 118 and possibly determining additional information for the re-detected defects using the output generated by the detector. In a metrology system embodiment, computer subsystem 120 may be configured for determining one or more characteristics of photomask 112 using the output generated by the detector.

Defect review typically involves re-detecting defects detected as such by an inspection process and generating additional information for the defects at a higher resolution, e.g., using the optical system described herein in a high magnification mode. Defect review is therefore performed at discrete locations on the photomask where defects have been detected by inspection. The higher resolution data for the defects generated by defect review is generally more suitable for determining attributes of the defects such as profile, roughness, more accurate size information, etc. Computer subsystem 120 may be configured to determine such information for defects on the photomask in any suitable manner known in the art.

Metrology processes are used at various steps during a mask manufacturing process to monitor and control the process. Metrology processes are different than inspection processes in that, unlike inspection processes in which defects are detected on a photomask, metrology processes are used to measure one or more characteristics of the photomask that cannot be determined using currently used inspection tools. For example, metrology processes are used to measure one or more characteristics of a photomask such as a dimension (e.g., line width, thickness, etc.) of features formed on the photomask during a process such that the performance of the process can be determined from the one or more characteristics. In addition, if the one or more characteristics of the photomask are unacceptable (e.g., out of a predetermined range for the characteristic(s)), the measurements of the one or more characteristics of the photomask may be used to alter one or more parameters of the process such that additional photomasks manufactured by the process have acceptable characteristic(s).

Metrology processes are also different than defect review processes in that, unlike defect review processes in which defects that are detected by inspection are re-visited in defect review, metrology processes may be performed at locations at which no defect has been detected. In other words, unlike defect review, the locations at which a metrology process is performed on a mask may be independent of the results of an inspection process performed on the mask. In particular, the locations at which a metrology process is performed may be selected independently of inspection results. In addition, since locations on the mask at which metrology is performed may be selected independently of inspection results, unlike defect review in which the locations on the mask at which defect review is to be performed cannot be determined until the inspection results for the mask are generated and available for use, the locations at which the metrology process is performed may be determined before an inspection process has been performed on the mask. Computer subsystem 120 may be configured to determine any suitable characteristics for the mask in any suitable manner known in the art.

In any of the system embodiments described herein, computer subsystem 120 shown in FIG. 1 may be configured to generate results that include at least the information determined for the mask based on the output generated by the detector possibly with any other output generated by the computer subsystem. The results may have any suitable format (e.g., a KLARF file, which is a proprietary file format used by tools commercially available from KLA, a results file generated by Klarity, which is a tool that is commercially available from KLA, a lot result, etc.). In addition, all of the embodiments described herein may be configured for storing results of one or more steps of the embodiments in a computer-readable storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another software module, method, or system, etc. to perform one or more functions for the mask or another mask.

Such functions include, but are not limited to, altering a process such as a fabrication process or step that was or will be performed on the mask in a feedback, feedforward, in-situ manner, etc. For example, the computer subsystem may be configured to determine one or more changes to a process that was or will be performed on the mask based on the detected defect(s) and/or other determined information. The changes to the process may include any suitable changes to one or more parameters of the process. For example, if the determined information is defects detected on the mask, the computer subsystem preferably determines those changes such that the defects can be reduced or prevented on other masks on which the revised process is performed, the defects can be corrected or eliminated on the mask in another process performed on the mask, the defects can be compensated for in another process performed on the mask, etc. The computer subsystem may determine such changes in any suitable manner known in the art.

Those changes can then be sent to a semiconductor fabrication system (not shown) or a storage medium (not shown in FIG. 1) accessible to both the computer subsystem and the semiconductor fabrication system. The semiconductor fabrication system may or may not be part of the system embodiments described herein. For example, the systems described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein have a number of advantages over other methods and systems for inspecting photomasks. For example, the embodiments described herein provide a special pupil filter design adapted for polarization control. Another advantage is that the combinations of $J_{xx}+iJ_{yy}$ and $J_{xx}-iJ_{yy}$ are realized in the output field adopting the pupil filters. An additional advantage is that the pupil filter designs for polarization control can be a complementary method to other polarization control features. A further advantage of the embodiments described herein is that the defect detection sensitivity can be enhanced using the pupil filter designs. Furthermore, an advantage of the embodiments described herein is the variation of best focus is reduced using pupil filters.

Polarization control and manipulation is crucial for EUV photomask inspection using DUV light. The performance of the traditional polarization control methods (x, y, or circular polarizations) for defect detection strongly depends on the pattern regions where the defects are located. The embodiments described herein can help to strongly improve the defect detection sensitivity which does not rely on the pattern choices. The proposed embodiments can also be utilized as a complementary mode to the currently used polarization control features.

The advantages described above are provided by one or more of the important new features of the embodiments described herein. These new features include, but are not limited to, the use of wave-plates and specially designed pupil filters to control the polarization state in the imaging path. Another new feature is the creation of the $J_{xx}+iJ_{yy}$ and $J_{xx}-iJ_{yy}$ combinations in the output field to enhance defect detection sensitivity. An additional new feature is the use of a linear analyzer as a pupil filter to create the $J_{xx}+iJ_{yy}$ and $J_{xx}-iJ_{yy}$ combinations. A further new feature is the use of a QWP along with a linear analyzer to create the $J_{xx}+iJ_{yy}$ and $J_{xx}-iJ_{yy}$ combinations.

Each of the embodiments of the systems described above may be further configured according to any other embodiment(s) described herein.

Another embodiment relates to a method for inspecting a photomask. The method includes directing light to the photomask. The method also includes controlling a polarization of light in a path of light from the photomask with a pupil filter positioned in the path of only the light from the photomask and configured for mixing four elements in a Jones matrix for the photomask in a coherent manner. In addition, the method includes detecting light from the pupil filter and generating output responsive to the detected light. The method further includes detecting defects on the photomask based on the output, which is performed with a computer subsystem.

Each of the steps of the method may be performed as described further herein. The method may also include any other step(s) that can be performed by the system(s) described herein. The steps of the method may be performed by the systems described herein, which may be configured according to any of the embodiments described herein.

Figure 8:
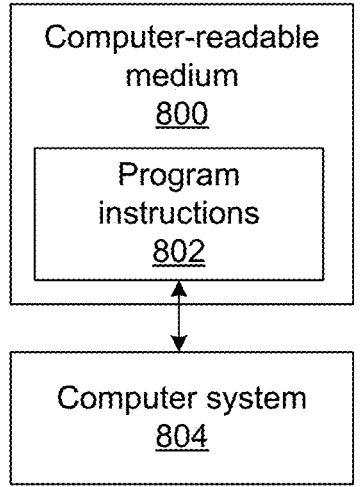
FIG. 8 is a block diagram illustrating one embodiment of a non-transitory computer-readable medium storing program instructions executable on a computer system for performing one or more of the computer-implemented methods described herein.

An additional embodiment relates to a non-transitory computer-readable medium storing program instructions executable on a computer system for performing a computer-implemented method for inspecting a photomask. One such embodiment is shown in FIG. 8. In particular, as shown in FIG. 8, non-transitory computer-readable medium 800 includes program instructions 802 executable on computer system 804. The computer-implemented method may include any step(s) of any method(s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 804 may be configured according to any of the embodiments described herein.

Further modifications and alternative embodiments of various aspects of the invention will be apparent to those skilled in the art in view of this description. For example, methods and systems for inspecting a photomask are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A system configured for inspecting a photomask, comprising:

an illumination subsystem configured to direct light to the photomask;

a pupil filter positioned in a path of only the light from the photomask and configured for controlling a polarization of the light in the path by mixing four elements in a Jones matrix for the photomask in a coherent manner, wherein the system is further configured for modifying the pupil filter or one or more polarizing elements in the illumination subsystem to thereby generate different output fields on a pupil plane in which the pupil filter is positioned, wherein a first of the different output fields is created with $J_{xx}+iJ_{yy}$ in orthogonal components of the first of the different output fields, and wherein a second of the different output fields is created with $J_{xx}-iJ_{yy}$, in orthogonal components of the second of the different output fields;

a detector configured for detecting the light from the pupil filter and generating output responsive to the detected light; and a computer subsystem configured for detecting defects on the photomask based on the output.

2. The system of claim 1, wherein the photomask is configured for use at one or more extreme ultraviolet wavelengths.

3. The system of claim 1, wherein the light comprises deep ultraviolet light.

4. The system of claim 1, wherein the illumination subsystem comprises one or more elements configured for controlling a polarization of the light directed to the photomask.

5. The system of claim 1, wherein the illumination subsystem and the pupil filter are further configured so that an additional output field on the pupil plane is a function of the four elements in the Jones matrix for the photomask, $$J_{PM} = \begin{pmatrix} J_{xx} & J_{xy} \\ J_{yx} & J_{yy} \end{pmatrix}.$$

6. The system of claim 1, wherein the pupil filter is further configured as a linear analyzer oriented at 45-degree.

7. The system of claim 6, wherein the illumination subsystem comprises a quarter-wave plate oriented at 90-degree and a half-wave plate oriented at −22.5 degree.

8. The system of claim 7, wherein the system is further configured for rotating the quarter-wave plate from 90-degree to 0-degree without modifying the half-wave plate and the linear analyzer to thereby generate the different output fields on the pupil plane in which the linear analyzer is positioned.

9. The system of claim 8, wherein first peak through-focus signals in the output for the defects generated with the first or second of the different output fields are higher than second peak through-focus signals in the output for the defects generated without the pupil filter positioned in the path of the light from the photomask.

10. The system of claim 1, wherein first peak through-focus signals in the output for the defects generated with the pupil filter positioned in the path of the light from the photomask are higher than second peak through-focus signals in the output for the defects generated without the pupil filter positioned in the path of the light from the photomask.

11. The system of claim 1, wherein first peak through-focus signals in the output for different types of the defects generated with the pupil filter positioned in the path of the light from the photomask are higher than second peak through-focus signals in the output for the different types of the defects generated without the pupil filter positioned in the path of the light from the photomask.

12. The system of claim 1, wherein first noise in the output generated for the photomask with the pupil filter positioned in the path of the light from the photomask is approximately equal to second noise in the output generated for the photomask without the pupil filter positioned in the path of the light from the photomask.

13. The system of claim 1, wherein a first best focus variation range of the system with the pupil filter positioned in the path of the light from the photomask is smaller than a second best focus variation range of the system without the pupil filter positioned in the path of the light from the photomask.

14. The system of claim 1, wherein the pupil filter comprises a quarter-wave plate oriented at 0-degree in combination with a linear analyzer oriented at 45-degree.

15. The system of claim 14, wherein the illumination subsystem comprises a first half-wave plate oriented at 0-degree and a second half-wave plate oriented at 22.5 degree.

16. The system of claim 15, wherein the system is further configured for rotating the first half-wave plate from 0-degree to 45-degree without modifying the second half-wave plate and the pupil filter to thereby generate the different output fields on the pupil plane in which the pupil filter is positioned.

17. The system of claim 14, wherein the illumination subsystem comprises a first half-wave plate oriented at 45-degree and a second half-wave plate oriented at 22.5 degree.

18. The system of claim 17, wherein the system is further configured for rotating the quarter-wave plate of the pupil filter from 0-degree to 90-degree without modifying the linear analyzer of the pupil filter, the first half-wave plate, and the second half-wave plate to thereby generate the different output fields on the pupil plane in which the pupil filter is positioned.

19. The system of claim 1, wherein the system is further configured for positioning the pupil filter in the path of only the light from the photomask for a first mode of the system, positioning the pupil filter out of the path of the light from the photomask for a second mode of the system, and inspecting the photomask with the first and second modes.

20. A non-transitory computer-readable medium, storing program instructions executable on a computer system for performing a computer-implemented method for inspecting a photomask, wherein the computer-implemented method comprises:

directing light to the photomask with an illumination subsystem;

controlling a polarization of light in a path of light from the photomask with a pupil filter positioned in the path of only the light from the photomask and configured for mixing four elements in a Jones matrix for the photomask in a coherent manner;

modifying the pupil filter or one or more polarizing elements in the illumination subsystem to thereby generate different output fields on a pupil plane in which the pupil filter is positioned, wherein a first of the different output fields is created with $J_{xx}+iJ_{yy}$ in orthogonal components of the first of the different output fields, and wherein a second of the different output fields is created with $J_{xx}-iJ_{yy}$ in orthogonal components of the second of the different output fields;

detecting light from the pupil filter and generating output responsive to the detected light; and detecting defects on the photomask based on the output.

21. A method for inspecting a photomask, comprising:

directing light to the photomask with an illumination subsystem;

controlling a polarization of light in a path of light from the photomask with a pupil filter positioned in the path of only the light from the photomask and configured for mixing four elements in a Jones matrix for the photomask in a coherent manner;

modifying the pupil filter or one or more polarizing elements in the illumination subsystem to thereby generate different output fields on a pupil plane in which the pupil filter is positioned, wherein a first of the different output fields is created with $J_{xx}+iJ_{yy}$ in orthogonal components of the first of the different output fields and wherein a second of the different output fields is created with $J_{xx}-iJ_{yy}$ in orthogonal components of the second of the different output fields;

detecting light from the pupil filter and generating output responsive to the detected light; and detecting defects on the photomask based on the output, wherein said detecting is performed with a computer subsystem.

* * * * *